March 10, 1959     D. F. SE LEGUE ET AL     2,876,963
AIR POWERED TOW REEL

Filed Nov. 24, 1954     2 Sheets-Sheet 1

INVENTORS:
David F. Se Legue
Wilmer L. Higbee

Their Patent Attorney

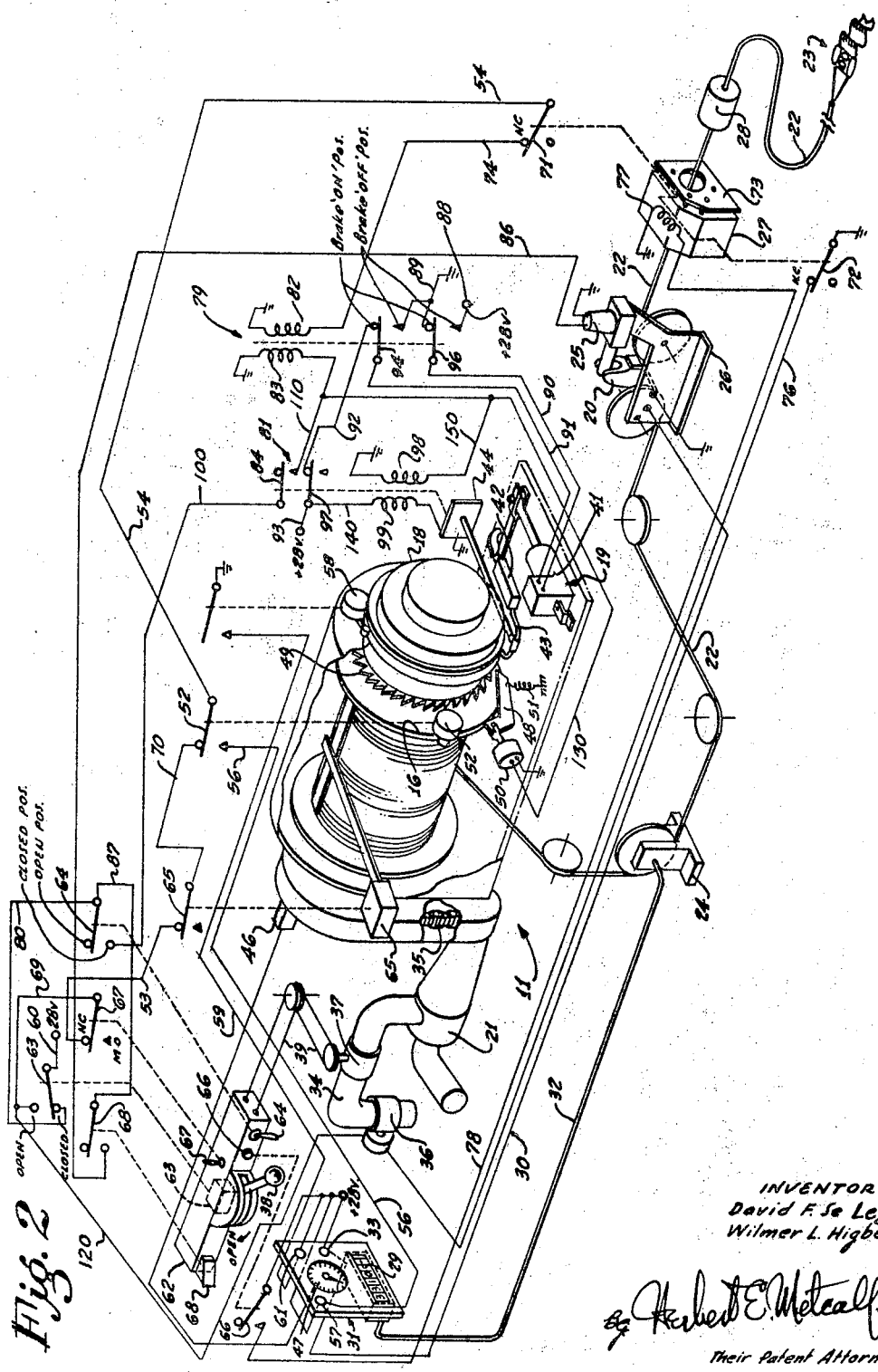

United States Patent Office 2,876,963
Patented Mar. 10, 1959

2,876,963
AIR POWERED TOW REEL

David F. Se Legue, San Gabriel, and Wilmer L. Higbee, Redondo Beach, Calif., assignors to Northrop Aircraft, Inc., Hawthorne, Calif., a corporation of California Application November 24, 1954, Serial No. 470,919

3 Claims. (Cl. 244—3)

This invention relates to reeling apparatus suitable for towing operations in connection with aircraft and more particularly to a high velocity tow reel assembly and controls therefor functioning to facilitate "reel-in" and "reel-out" operations in connection with a target or similar gear towed by a high speed aircraft.

Operations involved in the towing of targets or similar gear by high speed military and commercial aircraft equipped with presently available towing equipment presents numerous problems. Due to the marginal operating characteristics of currently available equipment unreasonably low limits are placed on the speed of a towing aircraft, this is especially true during the "reel-in" and "reel-out" phases of such operations. In some instances, in order to effect a reeling-in operation, the speed of the towing aircraft may be required to be lowered to a speed dangerously near its critical or stalling speed. Other factors contributing to the marginal characteristics of current towing equipment is the limited speed at which "reel-in" or "reel-out" operations can be executed. Accordingly the length of time a target or similar gear can be maintained on a range is materially limited.

The above type of prior art devices rely on the hydraulic system of the towing aircraft for their source of power. This source being limited, especially in so far as the quantity of fluid flow is concerned, results in the aforementioned marginal operating characteristics. Other factors adversely effecting the operation of prior art devices is the inability of the actuating means therefore to function as a prime mover and also as a braking facility. Space and weight limitations also restrict the size of a hydraulic actuator that can be mounted on a towing aircraft and accordingly the output of the actuator is limited rendering it inadequate for towing operations.

The present invention discloses a towing reel assembly and controls therefor particularly adapted for use with a jet type aircraft. The present reel assembly employs an air turbine functioning as a prime mover for actuating the winding spool of the reel assembly. Air for the turbine is bled from advance stages of the main jet engine compressor. The air turbine when supplied with large quantities of fairly low pressure air constitutes an extremely efficient prime mover in relation to its size and weight and provides other inherent advantages which will become apparent as the disclosure progresses.

An object of the present invention is to provide a high velocity tow reel assembly, especially adapted for use with jet type aircraft, the operation of which materially increases the tow mission time for flights of a target or similar gear over that achieved by currently available towing equipment.

Another object is to provide a high velocity tow reel assembly, especially adapted for use with jet type aircraft, the operation of which does not subject a towing aircraft to critical speeds during "reel-in" and "reel-out" operations.

Another object is to provide a high velocity tow reel assembly, especially adapted for use with jet type aircraft, in which the prime mover for the reel assembly functions as a combined power and braking facility.

These and other objects will become more apparent from the following description and drawings in which like reference characters denote like parts. It is to be expressly understood, however, that the drawings are for the purpose of illustration only and not a definition of the limit of the invention, reference being had for this purpose to the appended claims.

In the drawings:

Figure 2 is a combined perspective and schematic showing of the apparatus shown in Figure 1 and includes the necessary controls and electric circuits for controlling the operation of the assembly.

Figure 1:
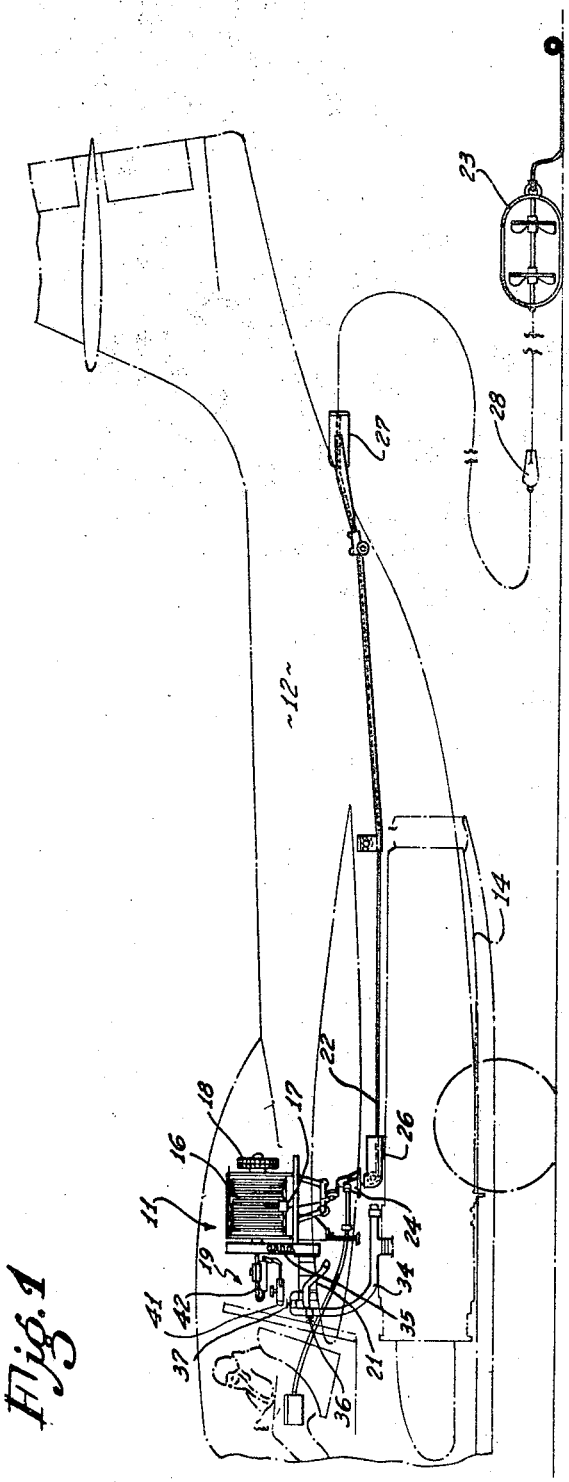
Figure 1 is a side elevational view of the tow reel assembly of the instant invention mounted in a jet aircraft.

Referring to Figure 1 a tow reel assembly 11 and operating controls therefor are shown in their relative positions in a jet type airplane 12 having at least one jet engine 14. The reel assembly as shown is mounted in the radar operator's compartment of the airplane; however, it is apparent that it may be mounted at any suitable location in the airplane.

The major component parts of the tow reel assembly comprise a winding spool 16, a level wind mechanism 17, brake and brake actuating mechanisms 18 and 19, respectively, and a prime mover 21 positioned substantially as shown in Figure 1. Wound on the cylindrical portion of the spool 16 is a flexible metal cable 22. One end of the cable is secured to the spool 16 and the other end is attached to a conventional banner and reflector type target 23 adapted to trail the airplane a suitable distance when the latter is airborne. Intermediate portions of the cable are routed through the level-wind mechanism 17 and a series of guiding pulleys and exits from the airplane at a position located on the underside of its aft fuselage. Between the level-wind mechanism and the location at which the cable exits from the airplane the cable is also routed through a cable measuring unit 24, a load sensor and cable cutting mechanism 26, and an aft reel-in limit switch 27. Slidably attached to the cable 22, at a distance ahead of the target 23 and aft of the switch 27, is an egg 28 which cooperates with the switch 27 and functions to control the operation of the assembly 11 in a manner presently described.

The unit 24 measures the amount of cable in feet reeled on or off the spool 16. This information is transmitted to a visual indicating device 29 (Figure 2) located on a pilot's control panel 31 by means of a flexible shaft 32. The mechanism 26 senses tension present in the cable 22 due to drag on the target 23 occurring during towing operations. This information is transmitted electrically through a conductor 30 to a signal light 33 also located on the panel 31. The mechanism 26 also includes a cable cutting blade 20 actuated by an electrically operated screw jack 25. The switch 27 provides means whereby reel-in operations are terminated at a predetermined time as the egg 28 contacts the bumper plate 73 of the switch 27 and before the target 23 contacts the airplane.

The prime mover for the reel assembly constitutes a ninety degree (90°) radial flow type air turbine 21. The turbine drives the winding spool 16 through a chain drive 35. Air for the turbine is bled from an advance stage of the compressor of the jet engine 14. Fluid flows from the engine compressor to the turbine 21 through a conduit 34. Located in the conduit is an electrically operative safety valve 36 and a manually actuated butterfly type valve 37. The valve 37 is linked to a throttle lever 38 by means of cables 39 and accordingly is responsive to movements of the throttle lever.

The brake 18 is of conventional disc type construction.

The mechanism 19 consists of an electrically operated screw jack 41 arranged to actuate the piston of a hydraulic cylinder 42. Extending between the cylinder 42 and brake 18 is a hydraulic line 43 having an auxiliary branch line terminating at a fluid pressure switch 44. Additional controls and electrical circuits utilized in connection with the assembly 11, other than those shown and described in connection with Figure 1, are schematically illustrated in Figure 2. A tachometer generator 46 cooperates with a tachometer 47 located on the panel 31 to visually indicate the speed (R. P. M.) of the spool 16 during the "reel-in" and "reel-out" operations. A solenoid actuated pawl member 48 is mounted for pivotal movement on fixed structure of the assembly 11. A ratchet wheel 49 is attached to the spool 16 for rotation therewith. The pawl is movable between engaged and disengaged positions by means of a solenoid and spring 50 and 51, respectively. In the engaged position of the pawl it engages the wheel 49 arresting rotary movement of the spool 16 in a "reel-out" direction. In the disengaged position the pawl is urged into disengaged relation with respect to the wheel 49 by means of the spring 51.

An inertia switch 52 is mounted in contact with and actuated by movements of the peripheral portion of one end of the spool 16. Should the reel exceed a predetermined speed during either the "reel-in" or reel-out" operation the switch 52 acts to automatically interrupt the flow of current through connectors 53 and 54 thereby actuating the brake 18. Simultaneously the switch 52 completes a circuit including a connector 56 and overspeed light 57, thereby warning the pilot that the predetermined speed of the spool 16 has been exceeded. A micro-switch 58 actuated by rotating portions of the brake 18, acts through a connector 59 intermittently energizing and de-energizing a blinker light 61, thereby indicating that the assembly 11 is functioning properly. A limit switch 65 also functions to disrupt the flow of current through connectors 53 and 54 should the supply of cable on the reel reach a predetermined minimum amount.

The aforementioned throttle lever 38 is pivotally mounted on a pilot's control panel 62. With the lever 38 in the position shown in Figure 2, commonly referred to as the lever's detent position, the valve 37 is closed thereby arresting the flow of air to the turbine 21. A throttle switch 63 is responsive to movements of the throttle lever 38, the switch being in its closed position as shown in Figure 2 at such times as the lever 38 is in its detent position. Also located on the pilot's control panel is a tow switch 64, a rearming switch 66, an auxiliary brake switch 67, and a cable cutting switch 68, all of which are manually operated by the pilot. The switch 67 is spring urged to a position permitting current flow between connectors 53 and 69 and is only removed from this position momentarily by the pilot. A pair of solenoid operated switches 71 and 72 located in the assembly 27 are linked together for simultaneous movement. These switches (71, 72) are moved from their closed to their open position at such times as the egg 28 contacts the bumper plate 73 on the assembly 27. At such times current flowing through connectors 54, 74, and 76 is interrupted. The switches 71 and 72 are subsequently returned to their closed position and the assembly 27 thereby rearmed by closing the switch 66 permitting current flow to the solenoid 77 through the connector 78. The electrical circuits controlling the operation of the tow reel assembly also include first and second dual wound relays 79 and 81, respectively. The first relay 79 includes coils 82 and 83 and a double-pole double-throw switch including contact members 94 and 96. The second relay 81 includes coils 98 and 99 and a double-pole double-throw switch including contact members 84 and 97.

The coil 82 of the relay 79 and switches 71, 52, 65, 67, and 63 are connected in series by connectors 60, 69, 53, 70, 54, and 74 to provide a circuit hereinafter referred to as the first energizing circuit. The first energizing circuit is closed at such times as the above switches are in their closed positions with the exception of the throttle switch 63, the latter switch being in the position indicated as open in Figure 2.

The other coil 83 of the first relay 79 is connected in series with the switches 63 and 64 and contact member 84 of the relay 81 by means of connectors 60, 80, 100, and 110. The circuit defined by the latter connectors, at such time as switches 63 and 64 and contact member 84 are in their closed positions, is hereinafter referred to as the second energizing circuit. The screw jack 25 of the mechanism 26 is energized by current flowing through connectors 86, 87, 80 and 60 at such times as the switches 63 and 68 are in their closed positions.

The component parts of the reel assembly and the electric circuits and components thereof having been described, a more complete understanding as to how they cooperate, also their novel features and advantages thereof, will be forthcoming from the following description of their operation.

Prior to and during take-off the tow switch 64 and cable cutting switch 68 are in their open positions. The throttle lever 38 is in its detent position automatically positioning the throttle switch 63 in its closed position and the valves 36 and 37 in their closed positions. Under the above conditions the coils 82 and 83 and 98 and 99 of the relays 79 and 81, respectively, are de-energized, the contact members 94 and 96 of the relay 79 are spring urged to their brakes-on position, and accordingly pressurized fluid is applied to the brake 18. The screw jack 41 has been activated by current flowing from a D. C. power source 88 through the connectors 89 to 93, inclusive, and contact members 94, 96 and 97 of relays 79 and 81. During this stage of operation the pawl 48 is not utilized as target drag may not be sufficient to maintain it in engaged relation with the ratchet wheel 49.

The reeling-out operation may be executed as soon as the airplane is air-borne and at the proper altitude. To effect this phase of the operation the throttle lever 38 is moved in the direction of the arrow (Figure 2) and adjusted so that a spool speed of approximately 400 R. P. M. will be maintained as the target 23 is reeled out. Moving the throttle lever from its detent position opens the switch 63 which energizes the coil 82 through the first energizing circuit. Energizing the coil 82 results in the contact members 94 and 96 being moved to their brake-off position thus reversing the flow of current to the screw jack 41. At this time current flows from the power source 88 to the brake actuating mechanism 19 through connectors 89, member 94, connectors 91 and 90, and contact member 96. Accordingly the brake is deactivated and the spool 16 is free to turn restricted only by the flow of air to the turbine 21. Opening the switch 63, that is moving it to its open position as shown in Figure 2, also results in current flow through the connector 97 to effect opening of the valve 36. The electric circuits including connectors 89–93, inclusive, and contact members 94, 96, and 97 are hereinafter referred to as a reversible D. C. circuit.

During either "reel-in" or "reel-out" operations automatic brake operation is provided should the pilot permit spool speeds in excess of 500 R. P. M. Should the spool speed exceed 500 R. P. M. the inertia switch 52 opens thereby opening the first energizing circuit and breaking the circuit to coil 82. Accordingly the flow of current to screw jack 41 is reversed and the brake 18 is applied to slow the speed of the spool. As soon as the spool's speed is again less than 500 R. P. M. the switch 52 will close and the brake will be released. The pilot is warned that the spool speed is being exceeded by means of the overspeed light 57, at such time as the switch 52 is moved to its over speed position, thus allowing him to make necessary throttle corrections. In this respect it should be noted that the pilot can control the speed of the spool by controlling the quantity of air flowing to the turbine 21. It is important that the pilot control the amount of air flowing to the turbine to prevent excessive riding of the brake and its subsequent failure due to "burn-out."

The preferred method of terminating the "reel-out" operation is carried out as follows. The throttle lever 38 is advanced until the tachometer 47 reads zero thus indicating that the power supplied by the turbine 21 and the drag on the target 23 are equal and the "reel-out" operation is terminated. The auxiliary brake switch 67 is then moved to its open position which opens the first energizing circuit and effects deenergization of the coil 82 and movement of the contact members 94 and 96 of relay 79 to their "brakes-on" positions. Switches 63 and 64 are then moved to their closed positions which results in the pawl 48 engaging the wheel 49 and the brake 18 being deactivated. Further movement of the spool 16 in a "reel-out" direction is then blocked by the pawl 48.

An alternate method of terminating the "reel-out" operation utilizes the brake 18 to arrest movement of spool 16. This method is not recommended however as it may subject the brake to excessive loads resulting in brake failure.

In this method the throttle lever 38 is retarded to its detent position. It will be apparent that this operation will automatically apply the brake and shut off the supply of air to the turbine 21. The "reel-out" operation is terminated after a predetermined quantity of cable has been reeled out as shown by the indicating device 29. The limit switch 65 functions in an obvious manner to prevent inadvertently reeling all of the cable from the spool 16.

At the termination of either the preferred or alternate "reel-out" operations fluid pressure in the braking system has activated the fluid pressure switch 44 thereby energizing the coil 99 of relay 81, the latter acting to close the contact member 84 and open the contact member 97 of relay 81. Accordingly it will be apparent that with tow switch 64 in its closed position the solenoid 50 will be energized by current flow through the second energizing circuit and a circuit including connector 130 and solenoid 50 to ground, the latter circuit is embraced in the second energizing circuit and is hereinafter referred to as the first secondary circuit. The closing of the first secondary circuit causes the pawl 48 to engage the ratchet wheel 49 to prevent movement of the spool 16 in the "reel-out" direction.

The fluid responsive switch 44, however, does not function until fluid pressure in the braking system exceeds 1300 p. s. i., thus a stopped condition of the spool is insured. Accordingly the above action of the contact member 84, solenoid 50, and pawl 48 is delayed until fluid pressure in the brake system exceeds a predetermined amount (1300 p. s. i.). The circuit defined by the connectors 93 and 140, coil 99 of relay 81, and the fluid responsive switch 44 is hereinafter referred to as the first auxiliary circuit. During the above operation the coil 98 of relay 81 is also energized by current flow through the circuit defined by connector 150 and coil 98 to ground (hereinafter referred to as the second secondary circuit) and both coils will remain energized as long as the switches 63 and 64 remain closed. The coil 83 of relay 79 is also energized when the switches 63 and 64 and contact member 84 are closed thus moving the switches 94 and 96 of relay 79 to their "brake-off" positions.

Prior to the reeling-in phase of the operation the speed of the airplane is reduced until target drag equals a predetermined amount as measured by the sensing mechanism 26 and indicated by the target drag light 33 coming on. This assures the availability of sufficient turbine power to effect the "reel-in" operation. The tow switch 64 is placed in its "open" position thereby deenergizing the solenoid 50 and coil 98 of relay 81. Pawl 48 is spring urged to disengage ratchet wheel 49 as spool 16 is rotated slightly in the "reel-in" direction. The throttle lever 38 is advanced in the direction of the arrow to maintain spool speed below 400 R. P. M.. As previously mentioned inertia switch 52 will also act during this phase of the reeling operation. Over speed warning light 57 will also come on to alert the pilot in the case of excessive spool speeds. The reel-in operation is terminated by retarding the throttle lever 38 to its detent position at which time the brake 18 is automatically applied and turbine air supply is cut off. In the event the pilot fails to cut off turbine air at the proper time the egg 28 contacts the bumper plate 73 of assembly 27 automatically activating the brake 18 and cutting off turbine air in a manner which is believed apparent. In this instance the switch assembly 27 will then have to be rearmed by energizing the coil 77 by means of an electrical current acting through the switch 66 and connector 78.

The cable and target may be jetisoned in the event of malfunctioning of the reel assembly. In this instance the throttle lever 38 is retarded to its detent position. This movement of the throttle lever activates the brake 18 and cuts off turbine air in a manner explained above. Cable cutting switch 68 is then closed activating the screw jack 25 which in turn activates the cutting blade 20.

The air turbine 21 serves important functions as a prime mover, as a braking facility during "reel-out" operations, and as a brake in the event of brake failure. In the latter instance the throttle lever 38 is advanced allowing sufficient air to flow to the turbine to balance the aerodynamic drag acting on the target.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In a high speed aircraft having a turbo-jet propulsion unit which includes a compressor, the sub-combination of towing equipment comprising: a cable reel mounted on the aircraft and having a rotatable winding spool; a towing cable wound on said spool and having a free end attached to gear trailing said aircraft, whereby an unwinding torque is exerted on said spool by said cable when said aircraft is air borne; a fluid motor drivingly connected to said spool for exerting a winding torque thereon; conduit means connected to said compressor and to said motor for supplying the latter with motive fluid under pressure from the former; and manually-operable throttle valve means in said conduit means for controlling flow of fluid therethrough to thereby vary said winding torque from a minimum less than said unwinding torque, whereby said motor acts as an unwinding brake for said spool, to a maximum in excess of said unwinding torque whereby said motor rotates said spool in a winding direction.

2. The sub-combination defined in claim 1 including electrically-actuated hydraulic brake means for the spool, switch means operable with the valve means, and a circuit including said brake means and said switch means for applying said brake means when said valve is closed and disengaging said brake means when said valve is open.

3. The subcombination defined in claim 2 including electrically-actuated positive detent means associated with the spool to positively restrain rotation thereof, pressure-actuated switch means connected to the brake means and actuated by a predetermined hydraulic-actuating pressure thereof, and a circuit including the switch means operable with the valve means, the pressure-actuated switch means, and the electrically-actuated detent means for actuating the latter only on the existence of the predetermined pressure in said brake means.

(References on following page)

References Cited in the file of this patent

UNITED STATES PATENTS

| Number | Name | Date |
|---|---|---|
| 865,732 | Vandervell et al. | Sept. 10, 1907 |
| 1,342,525 | Beregh | June 8, 1920 |
| 1,848,372 | Moran | Mar. 8, 1932 |
| 2,048,015 | Logue | July 21, 1936 |
| 2,372,963 | Lassen et al. | Apr. 3, 1945 |
| 2,374,892 | Peterson | May 1, 1945 |
| 2,612,020 | Griffith | Sept. 30, 1952 |
| 2,650,666 | Dorand | Sept. 1, 1953 |
| 2,692,102 | Cobham | Oct. 19, 1954 |
| 2,723,833 | Burfeind | Nov. 15, 1955 |
| 2,760,777 | Cotton | Aug. 28, 1956 |

FOREIGN PATENTS

| Number | Country | Date |
|---|---|---|
| 687,926 | Great Britain | Feb. 25, 1953 |
| 1,002,615 | France | Nov. 7, 1951 |